Aug. 2, 1955 — A. W. GARDES — 2,714,447
TUBING AND METHOD OF PRODUCING SAME
Filed June 22, 1950
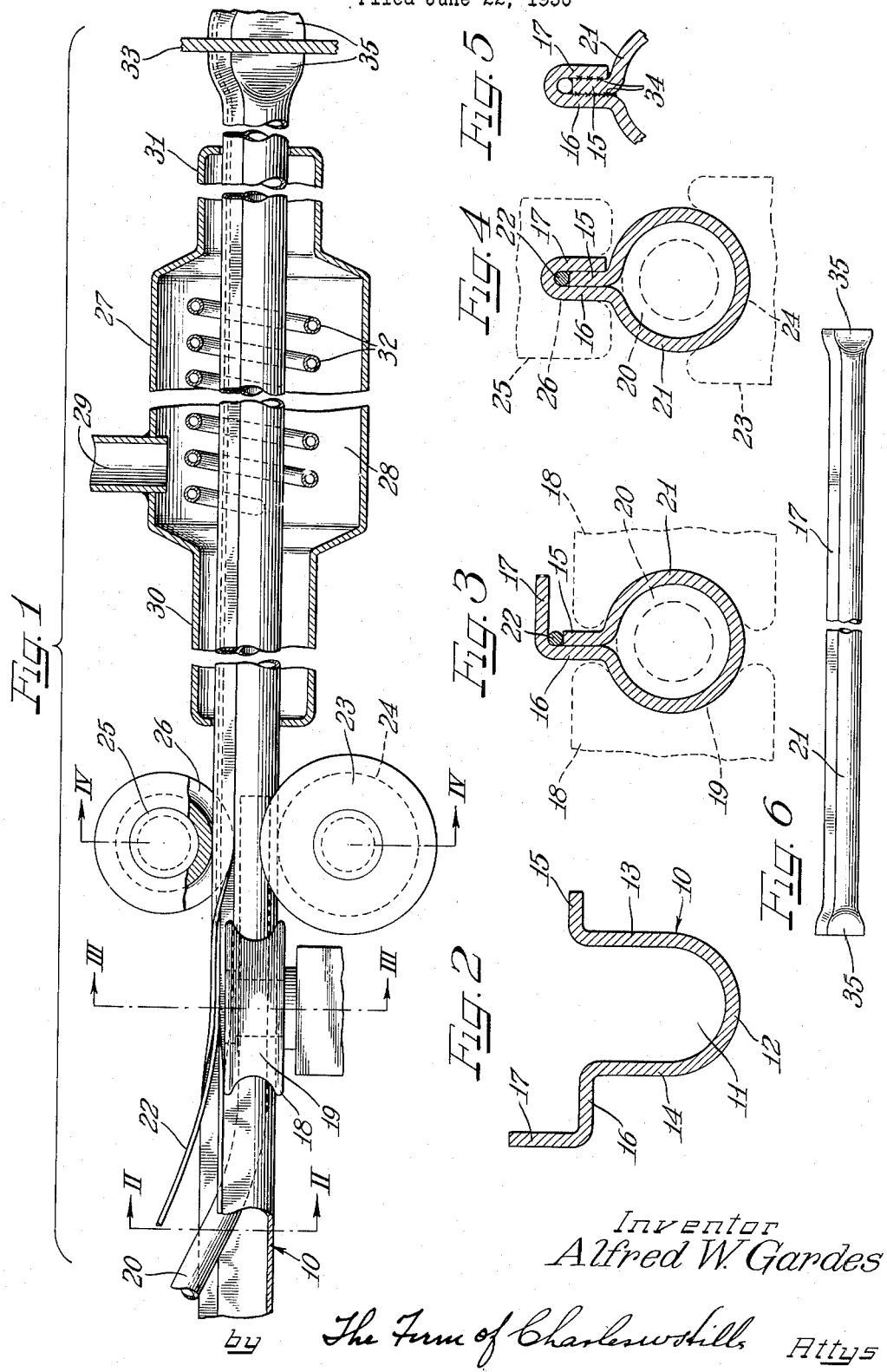
Inventor
Alfred W. Gardes
by The Firm of Charles W. Hills, Attys

United States Patent Office 2,714,447
Patented Aug. 2, 1955

2,714,447

TUBING AND METHOD OF PRODUCING SAME

Alfred W. Gardes, Detroit, Mich., assignor to Houdaille-Hershey Corporation, Detroit, Mich., a corporation of Michigan Application June 22, 1950, Serial No. 169,569

5 Claims. (Cl. 206—46)

The present invention relates to tubing and a method of producing the same, and more particularly to a method of making tubing from flat or strip metal stock and to tubing so produced.

The method of the present invention makes possible the efficient, low cost production of tubing from strip metal stock. The starting strip may be any desired metal strip or sheet material adapted for use in rolling or the like forming operations. For example, cold rolled steel may be employed.

The method of the present invention contemplates initially rolling or otherwise forming the strip material to a channeled configuration having a central groove provided with an arcuate bottom wall and upstanding side walls, each of the walls terminating in oppositely directed lateral flanges, and one of the flanges being provided with an upstanding projection or rib. Next, a hollow or tubular mandrel is inserted into the channel groove for snug bottoming therein, the mandrel serving as a support about which the channel stock is deformed into truly tubular configuration with the flanges projecting radially from the tubular portion and overlying the same.

Next, a brazing wire or similar fusible strip, preferably formed of copper or similar material having a relatively low melting point, is secured to the flanges and the tubing carrying the brazing wire is introduced into an induction heating furnace or the like. In order to prevent scale on both the exterior and the interior surfaces of the tubing during brazing and thereafter, a reducing atmosphere is maintained in the heating furnace and a reducing gas is introduced into the interior of the tubing. It will be appreciated that the heating step melts or fuses the brazing material which flows between the mating flange surfaces to form the same into an integral assembly, thus binding the originally channeled member into its tubular configuration.

After the tubing has been so formed and while the reducing atmosphere is retained within the interior of the tubing, the tubing is cut to a desired length by suitable means, as by flying shears, which both cut and seal the ends of the tubing lengths. The lengths of tubing thus cut and sheared are shipped for use while filled with a reducing atmosphere to prevent oxidation and/or corrosion of the tube interior.

The tubing thus produced by the method hereinbefore described includes a tubular length having an intermediate annular peripheral wall, the opposing ends of the peripheral wall being interleaved and brazed or otherwise secured together to form an air-tight seam. The interleaved portions of the peripheral tubing wall provide an upstanding multi-thickness rib or projection, and the securing and sealing of the extreme ends of a tubing length make possible the production of tubing free of interior corrosion due to the absence of air, moisture, and other impurities. Such tubing has been found to be especially adaptable for employment in heat exchangers, such as refrigerator condensers and the like, with the upstanding multi-thickness rib providing an additional heat-dissipating surface integral with and contiguous to the tubing portion itself.

It is, therefore, an important object of the present invention to provide an improved method of making tubing from an intially flat sheet or ribbon metal stock.

Another important object of the present invention is to provide a length of tubing having sealed opposing ends and a reducing atmosphere therein for preventing corrosion of the tubing interior.

It is a further important object of the present invention to provide a method of making tubing by deforming strip stock into a closed circular configuration, overlapping the strip edges, and securing the edges in a fluid-tight seal by the fusing of bonding material interposed therebetween.

Still another important object of the present invention is to provide heat exchanger tubing having peripheral annular walls provided with radial projections forming a multi-thickness upstanding rib anchoring the wall ends in a fluid-tight seal and having fluid-sealed end portions for retaining an anti-corrosion fluid within the interior space defined by the annular walls.

Yet a further important object of the present invention is to provide a method for making tubing from a continuous metal strip by the deformation of the strip about a hollow mandrel to a circular cross-section, deforming the strip lateral sides into interleaved radial ribs secured together in a fluid-tight seal, introducing a reduced atmosphere into the interior of the tubing, shearing the tubing to define a desired length, and simultaneously sealing the ends of the tubing lengths to retain the anti-corrosive atmosphere therein.

Other and further important objects of this invention will be apparent from the disclosures in the specification and the accompanying drawings.

On the drawings:

Figure 1 is a schematic fragmentary elevational view, with parts broken away and in section, illustrating a method of the present invention for producing tubing;

Figure 2 is a sectional view taken along the plane II—II of Figure 1 and illustrating the strip shape at one stage of the method;

Figure 3 is a sectional view taken along the plane III—III of Figure 1 and illustrating a second step in the manufacture of tubing;

Figure 4 is a sectional view taken along the plane IV—IV of Figure 1 and illustrating still another step in the method;

Figure 5 is a fragmentary sectional view similar to Figure 4 and illustrating a portion of the finished tube; and Figure 6 is a side elevational view of a tubing section of the present invention.

As shown on the drawings:

In Figure 1, reference numeral 10 refers generally to a strip of metal or similar material which is utilized in conjunction with the method of the present invention. Actually the strip 10 previously has been deformed to a channelled configuration including a central groove 11 defined by an arcuate bottom wall 12, an upstanding side wall 13, and a second upstanding side wall 14. The side wall 13 terminates in a laterally outturned flange 15 and the side wall 14 terminates in a similar lateral flange 16 having an upstanding end rib 17 (Figure 2). The channelled member 10 may be formed by any suitable metal working technique, preferably by continuous strip rolling techniques, as are well known in the art.

The continuous channelled strip 10 is fed through the nip of a pair of cooperating laterally opposed rollers 18 having peripheral concave grooved faces 19. Immediately prior to the introduction of the strip channel 10 into the nip defined by the rollers 18, a tubular mandrel 20 is positioned within the groove 11 in mating contact with the arcuate groove bottom 12. The mandrel 20 extends through the nip of the rolls 18 and thus serves as a central forming member about which the rolls 18 deform the upstanding side walls 13 and 14 of the member 10. In Figure 3, it will be seen that the arcuate bottom 12 with the side walls 13 and 14 cooperate to define a lower closed tubing portion 21 having an inside diameter substantially equal to the outside diameter of the mandrel 20.

The flanges 15 and 16 are likewise deformed during passage of the strip between the rolls 18, the flanges assuming an upright position overlying the tubing portion 21 and in extended surface contact with one another. The flange extension or rib 17 is carried by the flange 16 as the flange is deformed and, after passage of the strip through the rolls 18, the flange 17 overlies the terminal end of the flange 15. As the strip 10 is passed through the rolls 18 a brazing rod or strip 22 is interposed between the rib 17 at the adjacent end of the flange 15 (Figures 1 and 3), the rod or strip 22 being in surface contact with the opposing elements 15 and 17 and being confined therebetween for a purpose to be hereinafter more fully explained.

Following passage of the strip 10 through the rolls 18, the strip is next passed between a pair of vertically aligned, axially parallel rolls including a lower roll 23 adapted for rotation about a horizontal axis and having a peripheral recess 24 concentric with and conforming to the arcuate bottom of the tubing portion 21. An upper roll 25 is provided to overlie the strip 10, the roll 25 having a peripheral recess 26 snugly receiving therein the upstanding projection or rib formed by the flanges 15 and 16 and the rib 17. During passage of the strip 20 through the nip defined by the rolls 23 and 25, the rib 17 is deformed downwardly to a position generally parallel to the flanges 15 and 16 and in extended surface contact with the outer surface of the flange 15. This deformation of the rib 17 confines the brazing rod between the flanges 15 and 16 and the rib 17, thereby locking the rod therein against displacement and completing the rolling operations performed upon the strip.

Following passage of the strip through the rolls 23 and 25 the strip is next introduced into the interior of an elongated casing 27 defining an interior space 28 maintained under a reducing atmosphere by the introduction of a reducing gas, such as illuminating gas or a mixture of hydrogen and carbon monoxide, through a gas inlet pipe 29 communicating with the space 28. The casing 27 is provided with an elongated pre-heating zone housing 30 extending toward the rolls 23 and 25 and a cooling chamber housing 31 receiving the tubing after its passage through the space 28. A heating means, such as an induction coil 32, is provided within the chamber 28 for heating the tubing passing therethrough to a temperature sufficient to fuse the brazing rod 22. In case the brazing rod is of copper, this temperature should be on the order of 2100° F., and the length of the induction coil 32 and of the reducing atmosphere chamber 28 should be sufficient to heat the tube joint to this temperature at the speed at which the tubing is traveling.

The tubular mandrel 20 serves the additional function of introducing a reducing gas or atmosphere, such as that hereinbefore described, into the interior of the tubing after the same has passed through the cooperating rollers 18—18 and 23—23, so that any tendency toward scaling or corrosion of the interior of the tubing during heating within the induction coil is resister, and therefore a clean tube results from the induction heating step.

After passage of the tubing from the cooling zone 31, in which the tubing is retained within an exterior reducing atmosphere within the cooling chamber, the continuous length of tubing is severed into desired lengths by suitable means, as by utilization of a flying shear having a blade 33 serving to strike the tubing and to sever the same. The flying shear blade 33 also serves to crimp the severed tubing ends together into a fluid-tight seal, thereby sealing therein the reducing atmosphere or gas introduced thereinto through the tubular hollow mandrel 20.

As illustrated in Figures 5 and 6, the finished tubing comprises a lower tubular portion 21 formed from originally flat sheet stock having one terminal end 15 crimped or confined between the folded-over opposing terminal ends 16 and 17. The fusible or brazing metal rod 22 has been fused by passage of the tubing through the induction coil 32 and the fusible metal is confined between mating surfaces of the tubing sheet terminal ends, as indicated at 34, to form a fluid-tight seal for the tubing section 21. Similarly, the opposing ends of the tubing sections are flattened, as at 35, to form tubing section end seals for retaining the reducing atmosphere within the interior of the tubing.

It will be appreciated that the tubing length is thus free of corrosion or oxidation in the interior thereof, the interior is sealed against fluid or moisture passage thereinto, and the upstanding multi-thickness rib does not interfere with the circular cross-section of the tubing section 21 nor the passage of fluid or the like therethrough. Prior to use of the tubing, the sealed ends 35 are sheared therefrom by a suitable means, as by a rotary cutter blade or the like, so that the tubing having a clean interior may be utilized as desired, as, for example, in a heat exchanger. The tubing is particularly adapted for employment in plate and tube type heat exchangers with the tubing section or portion 21 accommodating securing of the tubing to a heat exchanger plate and the upstanding multi-thickness securing rib furnishing an additional transfer surface in efficient thermal conductivity with the interior of the tube portion 21.

It will be understood that modifications and variations may be effected without departing from the scope of the novel concepts of the present invention.

I claim as my invention:

1. The method of making tubing from a metallic strip which comprises forming said strip to a channel configuration having an arcuate bottom wall and upstanding side walls terminating in oppositely directed lateral flanges one of which has an upstanding terminal rib, positioning a tubular mandrel in said channel, deforming said side walls to an arcuate shape about said mandrel to cooperate with said bottom wall to define tubing of circular cross-section and to bring said lateral flanges into extended surface contact with each other, with said rib on said one flange overlying the second flange, inserting brazing material between said second flange and said rib, folding said rib into contact with said second flange to confine said brazing material therebetween, introducing a reducing gas through said mandrel into the interior of said tubing, heating said brazing material to join said flanges and said rib, shearing said tubing into sections of desired length and sealing said sections during said shearing to form a sealed tubing section having a reducing gas confined in the interior thereof to prevent corrosion of said interior.

2. A one-piece tubing comprising side walls defining an interior space and having flanges forming a multi-thickness rib projecting radially outwardly of said space, said tubing having integral compressed sealed end portions and a reducing atmosphere in said interior space to prevent corrosion of the inner surfaces of said tubing.

3. The method of making tubing from a metallic strip in the form of a channel having laterally extending flanges, which comprises folding said channel about a hollow mandrel into the form of tubing with said flanges projecting radially therebeyond, interposing brazing material between said flanges, introducing a reducing gas into the interior of said tubing through said mandrel, heating said tubing to fuse said brazing material and secure said flanges together, and simultaneously severing and flattening said tubing at spaced points therealong to form a tubing length having fluid-tight end portions and a reducing gas contained therein.

4. The method of making completely sealed heat exchanger tubing from a substantially continuous flat metal strip, which comprises forming said strip into a channel having laterally extending flanges, said channel along a predetermined path, deforming the moving channel to bring said flanges into abutment and to close the channel, interposing a brazing strip between said flanges, introducing a reducing gas into the interior of said closed channel, fusing said brazing strip to seal said flanges one to the other, and simultaneously severing and sealing a length of said closed and sealed and still moving channel to define a tubing length having a reducing atmosphere therein.

5. Seamed one-piece tubing comprising a wall of circular cross-section defining an interior space, longitudinally extending bonded-together portions formed integrally with said wall and projecting radially outwardly therefrom, the end portions of said tubing being compressed and sealed, and a reducing atmosphere in the interior of said tubing.

References Cited in the file of this patent

UNITED STATES PATENTS

| | | |
|---|---|---|
| 240,423 | James | Apr. 19, 1881 |
| 243,232 | Fancher | June 21, 1881 |
| 306,037 | Turner | Sept. 30, 1884 |
| 1,084,115 | Slick et al. | Jan. 13, 1914 |
| 1,608,905 | Murray et al. | Nov. 30, 1926 |
| 1,629,813 | Stevenson | May 24, 1927 |
| 1,742,392 | Higgins | Jan. 7, 1930 |
| 1,893,926 | Anderson | Jan. 10, 1933 |
| 1,945,594 | Chase et al. | Feb. 6, 1934 |
| 2,044,528 | Guhl | June 16, 1936 |
| 2,065,480 | Soper | Dec. 22, 1936 |
| 2,107,031 | Evans | Feb. 1, 1938 |
| 2,292,669 | Sinclair et al. | Aug. 11, 1942 |
| 2,445,152 | Poole | Feb. 25, 1943 |
| 2,322,421 | Cox | June 22, 1943 |
| 2,380,107 | Hobrook | July 10, 1945 |
| 2,469,975 | McCloy | May 10, 1949 |
| 2,480,706 | Brinen | Aug. 30, 1949 |

FOREIGN PATENTS

| | | |
|---|---|---|
| 502,577 | Great Britain | Mar. 21, 1939 |